(12) United States Patent
Caspers (10) Patent No.: US 8,783,703 B2
(45) Date of Patent: Jul. 22, 2014

(54) MECHANICAL TORQUE MULTIPLIER AND EVENER MECHANISM

(71) Applicant: Richard J. Caspers, Glenview, IL (US)

(72) Inventor: Richard J. Caspers, Glenview, IL (US)

( * ) Notice: Subject to any disclaimer, the term of this patent is extended or adjusted under 35 U.S.C. 154(b) by 0 days.

(21) Appl. No.: 13/665,402

(22) Filed: Oct. 31, 2012

(65) Prior Publication Data

US 2013/0106075 A1 May 2, 2013

Related U.S. Application Data

(60) Provisional application No. 61/553,737, filed on Oct. 31, 2011.

(51) Int. Cl.
*B62K 21/18* (2006.01)
*A63B 22/00* (2006.01)
*B62M 1/26* (2013.01)
*B62M 1/28* (2013.01)

(52) U.S. Cl.
CPC .. *B62M 1/26* (2013.01); *B62M 1/28* (2013.01)
USPC ............................... 280/253; 482/52; 482/57

(58) Field of Classification Search
USPC ........ 280/217, 233, 240, 253; 482/51, 52, 53, 482/57, 70, 79, 80
See application file for complete search history.

(56) References Cited

U.S. PATENT DOCUMENTS

| | | |
|---|---|---|
| 224,415 A | 2/1880 | French |
| 322,815 A | 7/1885 | Fleming |
| 369,860 A | 9/1887 | Kempster |
| 813,741 A | 2/1906 | Rudbeck |
| 3,760,905 A | 9/1973 | Dower |
| 4,282,442 A | 8/1981 | Massinger |
| 4,353,569 A | 10/1982 | Molina |
| 4,639,007 A | 1/1987 | Lawrence |
| 4,705,284 A | 11/1987 | Stout |
| 4,768,607 A | 9/1988 | Molina |
| 4,861,054 A | 8/1989 | Spital |
| 4,875,699 A | 10/1989 | Levavi |
| 4,928,986 A | 5/1990 | Carpenter |
| 4,976,451 A | 12/1990 | Kamenov |
| 5,280,936 A | 1/1994 | Schmidlin |
| 5,294,140 A | 3/1994 | Rinkewich |
| 5,527,246 A * | 6/1996 | Rodgers, Jr. ................. 482/57 |
| 5,690,346 A | 11/1997 | Keskitalo |
| 5,826,897 A | 10/1998 | Beard |
| 5,895,065 A | 4/1999 | Khomo |
| 6,007,083 A | 12/1999 | Currie |
| 6,217,398 B1 | 4/2001 | Davis |
| 6,378,882 B1 | 4/2002 | Devine |
| 6,409,632 B1 * | 6/2002 | Eschenbach ................. 482/52 |
| 6,932,370 B2 | 8/2005 | Jones et al. |
| 6,983,948 B2 | 1/2006 | Denison |
| 7,048,289 B2 | 5/2006 | Lau |
| 2005/0124466 A1* | 6/2005 | Rodgers, Jr. ................. 482/52 |

\* cited by examiner

*Primary Examiner* — Joseph M Rocca
*Assistant Examiner* — Jacob Knutson
(74) *Attorney, Agent, or Firm* — Boyle Fredrickson, S.C.

(57) ABSTRACT

An improved energy conversion system for propelling a manually powered vehicle is disclosed. The energy conversion system converts the linear kinetic energy applied by an operator to rotational kinetic energy to propel a vehicle. The energy conversion system includes a mechanical stroke multiplier to increase the distance over which the operator may apply a force to the vehicle.

11 Claims, 5 Drawing Sheets

MECHANICAL TORQUE MULTIPLIER AND EVENER MECHANISM

CROSS-REFERENCE TO RELATED APPLICATION

This application claims priority from U.S. Provisional Patent Application Ser. No. 61/553,737, filed on Oct. 31, 2011, the entirety of which is expressly incorporated by reference herein.

BACKGROUND OF THE INVENTION

1. Field of the Invention

The subject matter disclosed herein relates to an energy conversion device. More specifically, the present invention relates to a system adapted to convert linear kinetic energy to rotational kinetic energy. Specifically, a preferred embodiment of the present invention converts linear kinetic energy applied by an operator to rotational kinetic energy to propel a vehicle.

2. Discussion of the Related Art

As is known to those skilled in the art, human-powered vehicles have been proposed that may be driven by forces applied from either a hand or a foot. Energy may be supplied from a user's hand, for example, by a rowing motion or by pressing and pulling a lever back and forth. Energy may similarly be supplied from a user's foot through a rotational, or pedaling, motion or by pressing and releasing a set of foot pedals.

However, these vehicles are subject to certain limitations. One such limitation is the length of stroke an operator is able to use to apply a force to the vehicle. Rowing motions, for example, are limited to the reach of the operator and leg-pressing motions are limited to the stroke of a leg between a flexed and an extended position. Because the energy transferred from the operator to the vehicle is proportional to both the force applied and the distance over which it is applied, the length of stroke of an operator is a limiting factor in the amount of energy an operator can apply to propel a vehicle.

Therefore, an energy-conversion system which allows for more energy to be transferred to the output shaft would be desirable.

BRIEF DESCRIPTION OF THE INVENTION

Consistent with the foregoing and in accordance with the subject matter as embodied and broadly described herein, a human powered vehicle incorporating a mechanical stroke multiplying system is described in suitable detail to enable one of ordinary skill in the art to make and use the invention.

An improved energy conversion system for propelling a manually powered vehicle is disclosed. The energy conversion system converts the linear kinetic energy applied by an operator to rotational kinetic energy to propel a vehicle. The energy conversion system includes a mechanical stroke multiplier to increase the distance over which the operator may apply a force to the vehicle.

According to one embodiment of the invention, a mechanical force multiplier for use in a manually powered vehicle and configured to be mounted to a vehicle frame includes a first member pivotally connected to a first point on the vehicle frame and a second member pivotally connected to a second point on the vehicle frame where the second member is longer than the first member. A force receiving member is operatively connected to the second member and is configured to receive a force from an operator positioned on the vehicle frame. The mechanical force multiplier also includes a rigid section having a first end and a second end. The first end of the rigid section is pivotally connected to each of the first and second members. As the force from the operator is applied to the force receiving member, the second end of the rigid section travels in an arcuate path.

According to another aspect of the invention, the first end of the rigid section includes a first connection point and a second connection point spaced apart from the first connection point. An end of the first member, distal from the first point on the vehicle frame, is pivotally connected to the first connection point of the first end of the rigid section, and an end of the second member, distal from the second point on the vehicle frame, is pivotally connected to the second connection point of the first end of the rigid section. As the force from the operator is applied to the force receiving member, the first member pivots about the first point on the frame, and as the force from the operator is applied to the force receiving member, the second member pivots about the second point on the frame. As each of the first and second members pivots about its respective points on the vehicle frame, the end of the first member, distal from the first point on the vehicle frame, travels in a shorter arcuate path than the end of the second member, distal from the second point on the vehicle frame such that the rigid section is rotated about the end of the first member distal from the first point on the vehicle frame.

According to yet another aspect of the invention, the mechanical force multiplier may include a first lever having a first end and a second end. The first end of the first lever is pivotally connected to the vehicle frame, and the second end of the first lever is configured to engage the second end of the rigid section such that the first lever moves between a first position and a second position as the second end of the rigid section travels in the arcuate path. The manually powered vehicle includes a drive train having a rotational drive member and a clutch operatively connected to the rotational drive member. The mechanical force multiplier may further include a second lever having a first end and a second end. The first end of the second lever is connected to the second end of the first lever via a cable, and the second end of the second lever is connected to the clutch to drive the rotational drive member.

According to another embodiment of the invention, a mechanical force multiplier for multiplying a force applied by a human operator seated on a first frame is disclosed. The mechanical force multiplier includes a rigid frame portion having a first end and a second end, and a pivoting frame portion having a first end and a second end. The first end of the pivoting frame portion is pivotally connected to the first end of the rigid frame portion, and the second end of the pivoting frame portion is pivotally connected to the first frame. A force receiving member is mounted to the pivoting frame and is configured to receive the force applied by the human operator. The first end of the pivoting frame portion travels a first distance responsive to the force applied by the human operator, and the second end of the rigid frame portion travels a second distance responsive to the force applied by the human operator, where the second distance is greater than the first distance.

According to still another embodiment of the invention, a manually powered vehicle includes a vehicle frame, a chair mounted to the vehicle frame and configured to receive an operator, at least one foot pedal configured to receive a force applied by the operator, and at least one mechanical force multiplier. The mechanical force multiplier includes a rigid frame portion having a first end and a second end, and a pivoting frame portion having a first end and a second end. The first end of the pivoting frame portion is pivotally connected to the first end of the rigid frame portion, the second end of the pivoting frame portion is pivotally connected to the vehicle frame, and one of the foot pedals is mounted to each pivoting frame. The manually powered vehicle also includes at least one of each of the following: a roller, a first lever, a cable, a second lever, and a pulley. Each roller is operatively connected to the second end of the rigid frame portion of one of the mechanical force multipliers. Each first lever has a first end, a second end, and a surface configured to be engaged by the roller. The first end of each of the first levers is pivotally connected to the vehicle frame. Each cable is connected proximate to the second end of one of the first levers. Each second lever has a first end and a second end. The first end of each of the second levers is connected to one of the cables. Each pulley is configured to engage one of the cables extending between the second end of one of the first levers and the first end of one of the second levers. The manually powered vehicle also includes a rotating drive member including at least one clutch and a plurality of wheels. Each clutch is driven by the second end of one of the second levers, and at least one of the wheels is driven by the rotating drive member.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

Detailed Description of the Preferred Embodiments

The various features and advantageous details of the subject matter disclosed herein are explained more fully with reference to the non-limiting embodiments described in detail in the following description.

Figure 1:
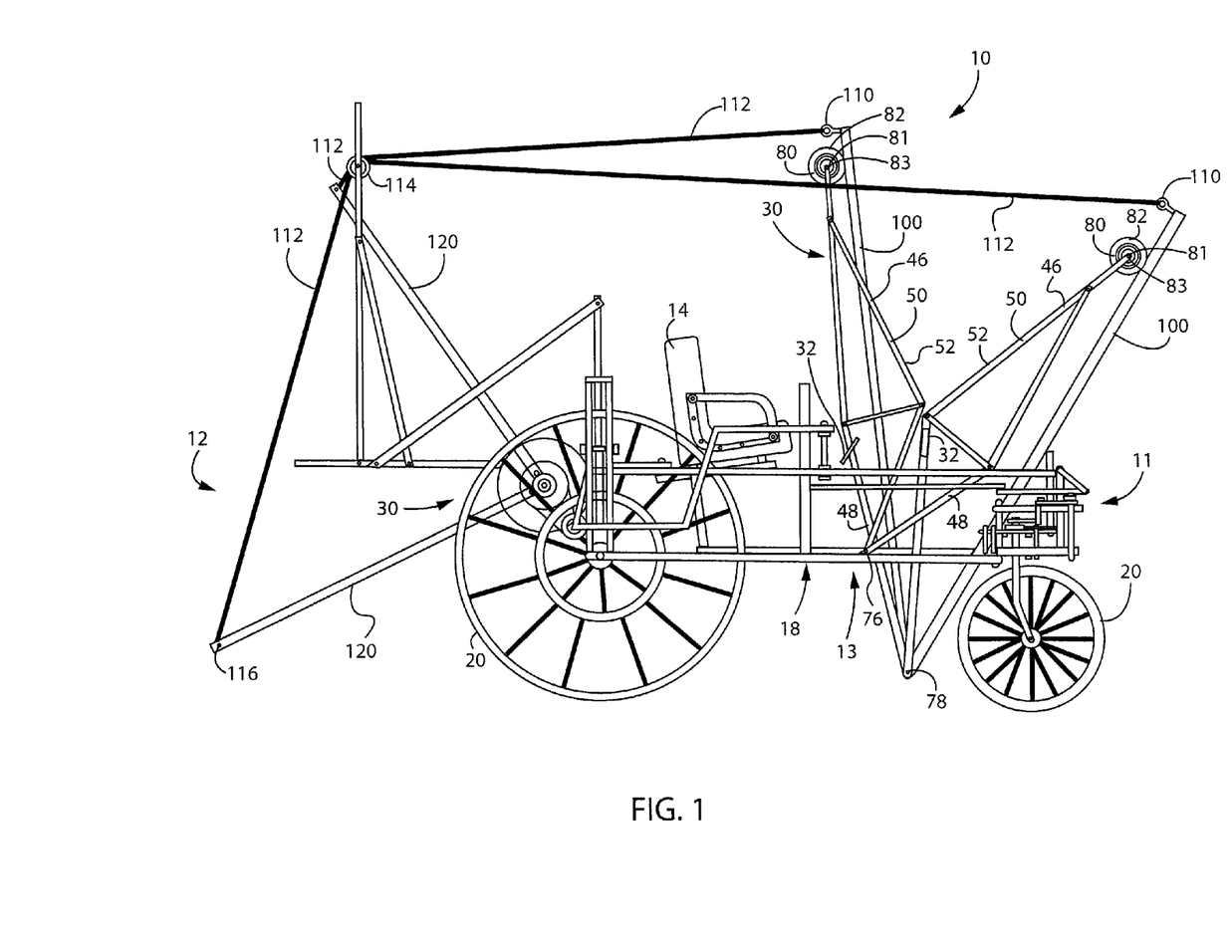
FIG. 1 is a side elevation view of one embodiment of a human powered vehicle according to the present invention.
Figure 5:
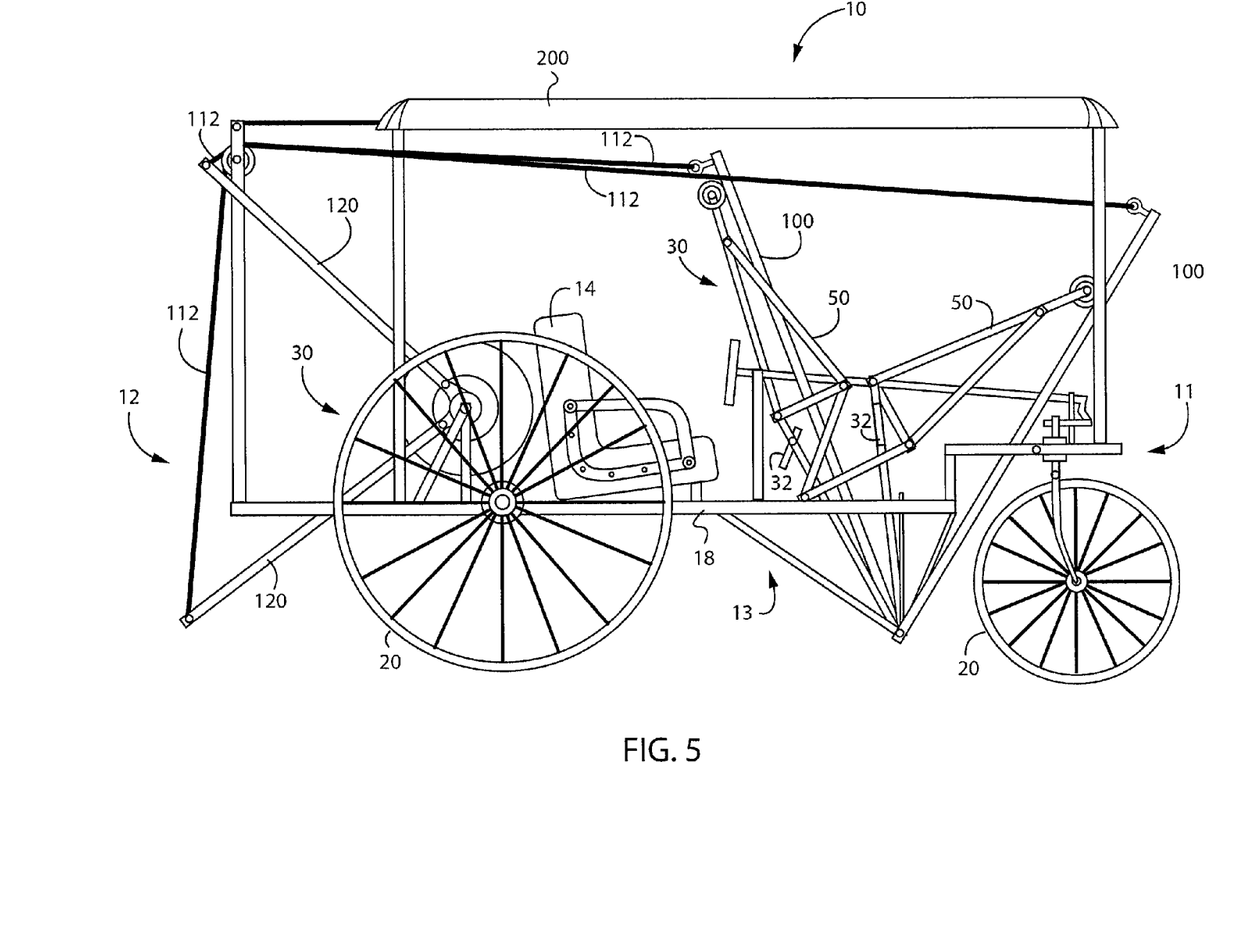
FIG. 5 is a side elevation view of another embodiment of a human powered vehicle according to the present invention.

Turning initially to FIG. 1, a human powered vehicle is designated generally by reference numeral 10. The vehicle 10 includes a seat 14 configured to receive a human operator (not shown). The seat 14 is mounted to a frame 18. The frame 18 is configured to receive a plurality of wheels 20. According to one embodiment of the invention, four wheels 20 are mounted to the frame 18 with two wheels 20 mounted toward a front end 11 of the vehicle 10 on each side 13 of the vehicle 10 and two wheels 20 mounted toward a rear end 12 of the vehicle 10 on each side 13 of the vehicle. Preferably, at least three wheels are mounted to the frame 18 with two wheels 20 mounted toward each side 13 of the vehicle 10 near either the front end 11 or the rear end 12 of the vehicle 10. It is contemplated that still other numbers and configurations of wheels 20 may be used without deviating from the scope of the invention. A drive train 30 receives a force applied by the operator and transfers the force to at least one of the wheels 20 to propel the vehicle 10. Referring also to FIG. 5, the vehicle 10 may include a roof 200 or canopy mounted to the frame 18 to provide shade and/or protection from inclement weather to the operator.

Figure 3:
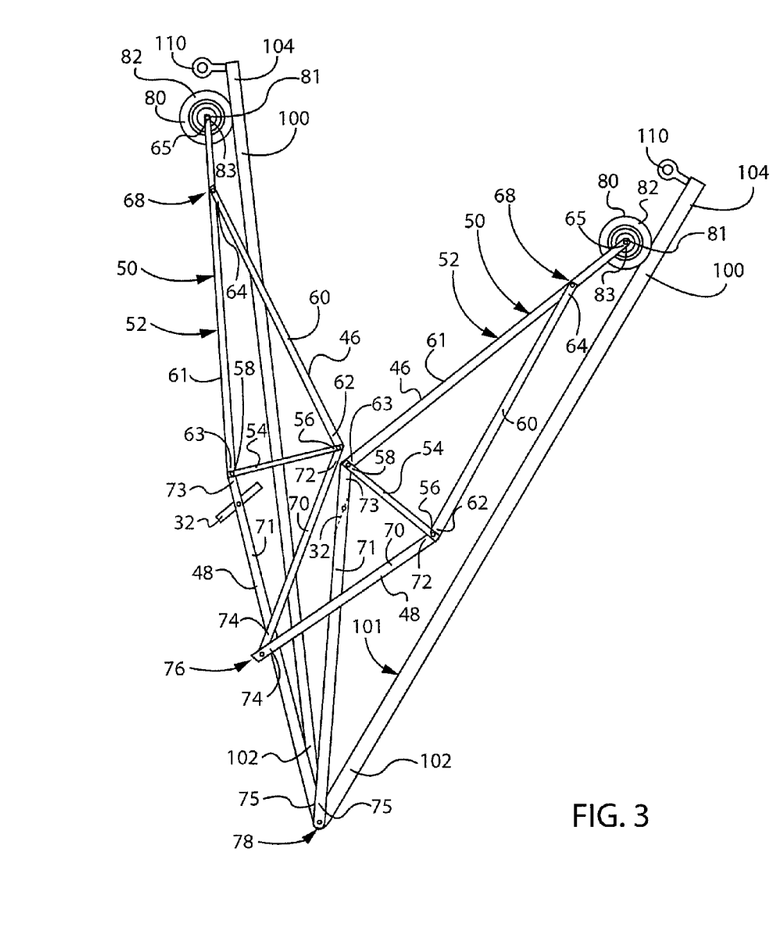
FIG. 3 is a side elevation view of the mechanical multiplier incorporated into the human powered vehicle of FIG. 1.

According to one embodiment of the invention, the drive train 30 includes two force receiving members, e.g., foot pedals 32. Each foot pedal 32 is configured to engage one of the operator's feet and is operatively connected to a mechanical multiplier 50. The mechanical multiplier 50 is of frame construction and is made from any suitable material but is preferably made from a lightweight material, for example, aluminum or a rigid plastic material. According to one embodiment of the invention, each member of the mechanical multiplier 50 is an elongated bar, which may be solid, tubular, or have a channel extending along the bar, and which has any suitable cross-sectional area such as rectangular, square, circular, or oval.

Each mechanical multiplier 50 includes a pair of side frames 52 laterally displaced from each other. Each side frame 52 has at least one rigid section, e.g., a first, rigid frame portion 46, and a second, pivoting frame portion 48. Each rigid frame portion 46 includes a center post 54 having a first end 56 and a second end 58, the second end 58 being opposite the first end 56. The rigid frame portion 46 further includes a first bar 60 and a second bar 61 extending generally in a first direction from the center post 54. Each of the first and second bars, 60 and 61, has a first end, 62 and 63 respectively, and a second end, 64 and 65 respectively. Each of the second ends, 64 and 65, is opposite from the respective first end, 62 and 63. The first end 62 of the first bar 60 is rigidly mounted proximate to the first end 56 of the center post 54, and the first end 63 of the second bar 61 is rigidly mounted proximate to the second end 58 of the center post 54. The first bar 60 is shorter than and angled toward the second bar 61 such that the second end 64 of the first bar 60 intersects the second bar 61 at a point 68 proximate to but offset from the second end 65 of the second bar 61. The second end 64 of the first bar 60 is rigidly connected to the second bar 61 at this intersection point 68. Thus, the center post 54, the first bar 60, and the second bar 61 define the rigid frame portion 46 of the side frame 52. Preferably, the rigid frame portion 46 with a first and second end is pivotally connected to the frame 18 by the pivoting frame portion 48 proximate to the center post 54, as further described below. The rigid frame portion 46 is also configured to engage a forward lever 100 proximate to the second end 65 of the second bar 61, as also further described below. It is contemplated that other numbers and configurations of bars may extend in the first direction from the center post 54, or other central member, and may form other geometric shapes without deviating from the scope of the invention.

A roller 80 is operatively connected between the second end 65 of the second bar 61 of each of the rigid frame portions 46. The roller 80 includes, for example, a wheel 82 and an axle 83. The axle 83 is rigidly mounted between the second bar 61 of each of the rigid frame portions 46. An opening 81 extending through the center of the wheel 82 is configured to slide onto the axle 83, rotatably mounting the wheel 82 to the axle 83.

The pivoting frame portion 48 of the side frame 52 includes a first member, e.g., a third bar 70 and a second member or bar, e.g., fourth bar 71, extending generally in a second direction from the center post 54, where the second direction is generally opposite the first direction in which the rigid frame portion 46 extends. Each of the third and fourth bars, 70 and 71, has a first point or end, 72 and 73 respectively, and a second point or end, 74 and 75 respectively. Each of the second ends, 74 and 75, is opposite from the respective first end, 72 and 73. The first end 72 of the third bar 70 is pivotally mounted proximate to the first end 56 of the center post 54 at a first connection point. The first end 73 of the fourth bar 71 is pivotally mounted proximate to the second end 58 of the center post 54 at a second connection point. The second end 74 of the third bar 70 is pivotally mounted to the frame 18 at a first pivot rod 76. The second end 75 of the fourth bar 71 is pivotally mounted to the frame 18 at a second pivot rod 78. Optionally, each of the second ends, 74 and 75, of the third and fourth bars, 70 and 71 respectively, may be connected to the frame 18 at separate pivot points without deviating from the scope of the invention. The third bar 70 is shorter than the fourth bar 71, and the third and fourth bars, 70 and 71, are angled toward each other such that they cross between the center post 54 and the frame 18, forming an "X" as viewed from the side.

Each mechanical multiplier 50 engages a corresponding forward lever 100. The forward lever 100 has a first end 102 and a second end 104. The first end 102 of the forward lever 100 is pivotally mounted at the second pivot rod 78. The second end 104 of the forward lever 100 travels in an arcuate path from a first, retracted position to a second, extended position. The roller 80, operatively connected between the second end 65 of the second bar 61 of each of the side frames 52, engages a surface 101 of the lever, causing the forward lever 100 to move between the first and the second positions.

A connection member 110 is mounted proximate to the second end 104 of the forward lever 100. According to one embodiment of the invention, the connection member 110 is an eyehook. However, it is contemplated that the connection member 110 may be any suitable device to which a cable 112 may be connected. The cable 112 is operatively connected to the connection member 110 and extends toward the rear end 12 of the vehicle 10. The cable 112 passes over a pulley 114 mounted on the frame 18 proximate the rear end 12 of the vehicle and is operatively connected to a connection member 116 mounted on a rear lever 120.

Figure 2:
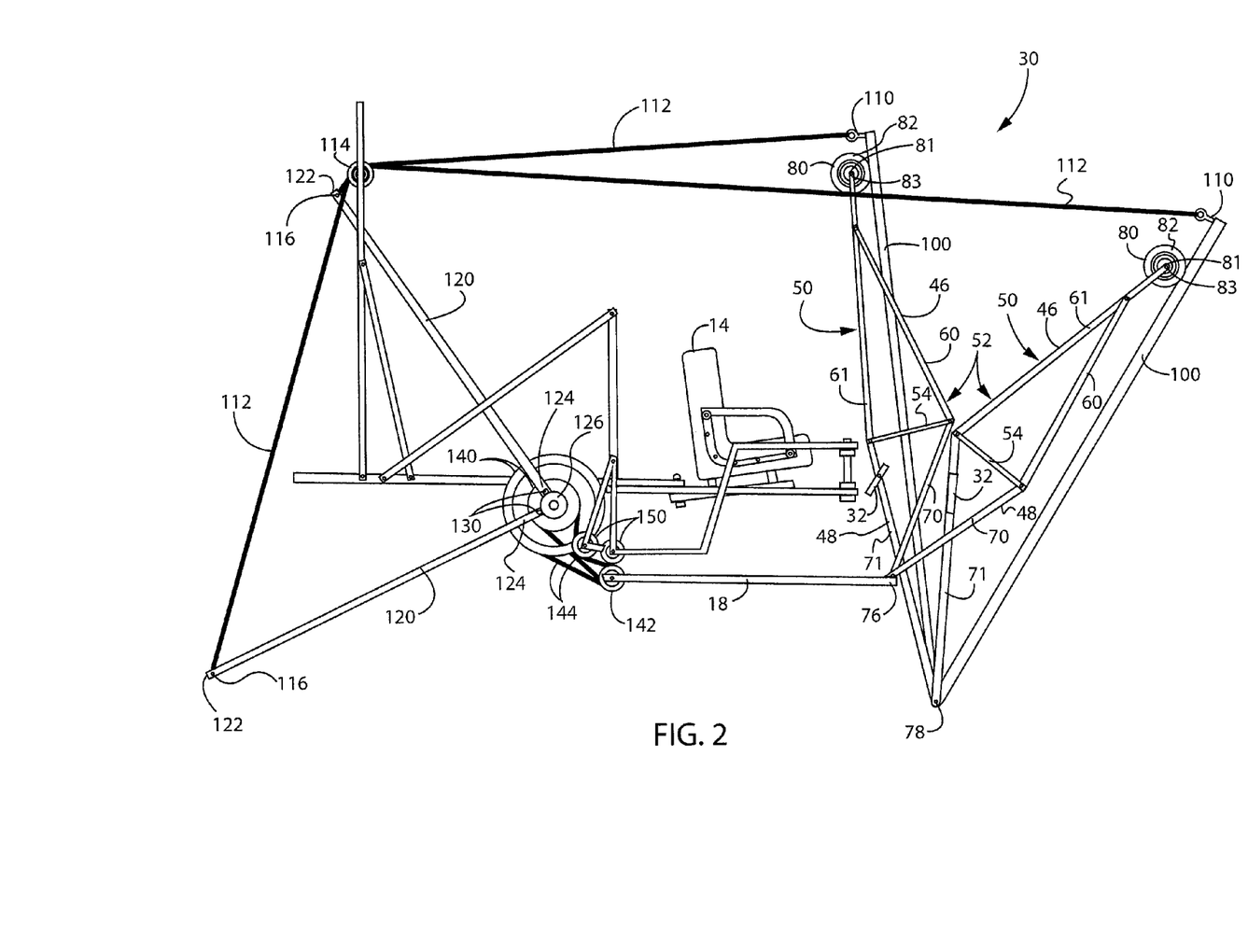
FIG. 2 is a partial side elevation view of the human powered vehicle of FIG. 1 including the drive members.

The rear lever 120 is pivoted about a drive shaft 126 by the cable 112 to rotate at least one wheel 20 of the vehicle 10. The rear lever 120 includes a first end 122 and a second end 124. The connection member 116 is mounted proximate to the first end 122. The second end 124 is operatively connected to the drive shaft 126. According to one embodiment of the invention, the second end 124 of the rear lever 120 is rigidly connecting to a ratcheting device such as an overriding clutch 130. As shown in FIG. 2, the second end 124 of the rear lever 120 is operatively connected to the driving portion 132 of the overriding clutch 130. The driven portion 134 of the overriding clutch 130 is mounted to the drive shaft 126. The drive shaft 126 preferably includes one or more gears 140 mounted on the drive shaft 126. The gears 140 on the drive shaft 126 may be coupled directly or indirectly, for example, via a chain or belt 144 to one or more gears 142 connected to a wheel 20. The gears 142 connected to the wheel 20 may be mounted on a hub or an axle 146 for the wheel 20. If multiple gears, 140 or 142, are mounted on either the drive shaft 126 or the axle 146, respectively, a selection device 150 may be included to engage the desired gear 140 on the drive shaft 126 to the desired gear 142 on the axle 146. The selection device 150 may be, but is not limited to, a belt tensioner, a derailleur, or a clutch.

In operation, an operator sits in the seat 14 and applies a force to at least one of the foot pedals 32. The operator may apply the force to both foot pedals 32 in tandem or to one of the foot pedals 32 at a time in an alternating fashion. Each foot pedal 32 is mounted between the fourth bars 71 of each pivoting frame portion 48 of the side frame 52 proximate to the first end 73 of each of the fourth bars 71. Because the second end 75 of each of the fourth bars 71 is pivotally connected to the second pivot rod 78, the force applied to the foot pedal 32 causes the first end 73 of the fourth bar 71 of each side frame 52 of the mechanical multiplier 50 to pivot forward. The first end 73 of the fourth bar, being connected to the second end 58 of the center post 54, causes the rigid frame portion 46 of the mechanical multiplier 50 to similarly rotate forward.

As the rigid frame portion 46 of the mechanical multiplier 50 rotates forward, the third bar 70 also exerts a force on the rigid frame portion 46 of the mechanical multiplier 50. The first end 72 of the third bar 70 is connected to the first end 56 of the center post 54. Because the third bar 70 is shorter than the fourth bar 71 and because the second end 74 of the third bar is pivotally mounted to the frame 18 at the first pivot rod 76, the third bar 70 exerts a rotational force on the rigid portion of the mechanical multiplier 50, causing the center post 54 to rotate forward at a faster rate than the first end 73 of the fourth bar 71. Thus, as the rigid frame portion 46 of the mechanical multiplier 50 is being moved forward by the fourth bar 71, the third bar additionally causes the rigid frame portion 46 of the mechanical multiplier 50 to pivot about the connection between the first end 73 of the fourth bar and the second end 58 of the center post 54. As a result, the end of the rigid frame portion 46 distal from the second pivot rod 78 travels a greater distance than the distance traveled by the foot pedal 32. According to one embodiment of the invention, the distal end of each rigid frame portion 46 travels two to six times the distance and, preferably, at least four times the distance the foot pedal 32 travels.

The roller 80, mounted at the distal end of the mechanical multiplier 50, transfers the force applied by the operator to the forward lever 100. The roller 80 is mounted between the second ends 65 of the second bar 61 of each rigid frame portion 46. A hole 81 in the center of each roller 80 slides over any suitable round member, allowing the roller 80 to rotate between the rigid frame portion 46. As the mechanical multiplier rotates forward, the roller 80 engages a surface 101 proximate to the second end 104 of the forward lever 100. The roller 80 causes the forward lever 100 to pivot about the first end 102 of the forward lever, rolling down the surface 101 as the rigid frame portion 46 of the mechanical multiplier 50 is both rotated forward by the fourth bar 71 and pivoted forward by the third bar 70. Because the second end 104 of the forward lever 100 extends beyond the roller 80, the second end 104 of the forward lever 100 will travel a still greater distance than the second end 65 of the second bar 61 of each rigid frame portion 46. It is contemplated that the length of travel of the second end 65 of the forward lever 100 may be about 70 inches.

As the forward lever 100 rotates forward, the cable 112 transfers the force from the forward lever 100 to a rear lever 120. The cable 112 is connected to the connection member 110 mounted at the second end 104 of the forward lever 100. Consequently, as the forward lever 100 is pivoted forward, the lever 100 pulls the cable 112 forward. The cable 112 is routed from the front end 11 to the rear end 12 of the vehicle over the pulley 114 mounted to the frame 18 at the rear end 12 of the vehicle. The opposite end of the cable 112 is affixed to the first end 122 of the rear lever 120. Because the second end 124 of the rear lever 120 is connected to the overriding clutch 130, as the cable 112 is pulled forward, it causes the rear lever 120 to pivot from a first position to a second position.

The overriding clutch 130 has a driving portion 132 and a driven portion 134. As the rear lever 120 is rotated from the first position to the second position, the rear lever 120 rotates the driving portion 132 of the overriding clutch 130 and the driving portion 132 engages the driven portion 134 using, for example, a ratchet or spring mechanism and transfers the force from the rear lever 120 to the drive shaft 126. As the forward lever 100 returns to its original position, the cable is similarly returned to its original position, allowing the rear lever 120 to return to the first position. As the rear lever 120 moves from the second position back to the first position, the ratchet or spring mechanism disengages the driving portion 132 from the driven portion 134 and allows the drive shaft 126 to continue rotating in the forward direction.

Figure 4:
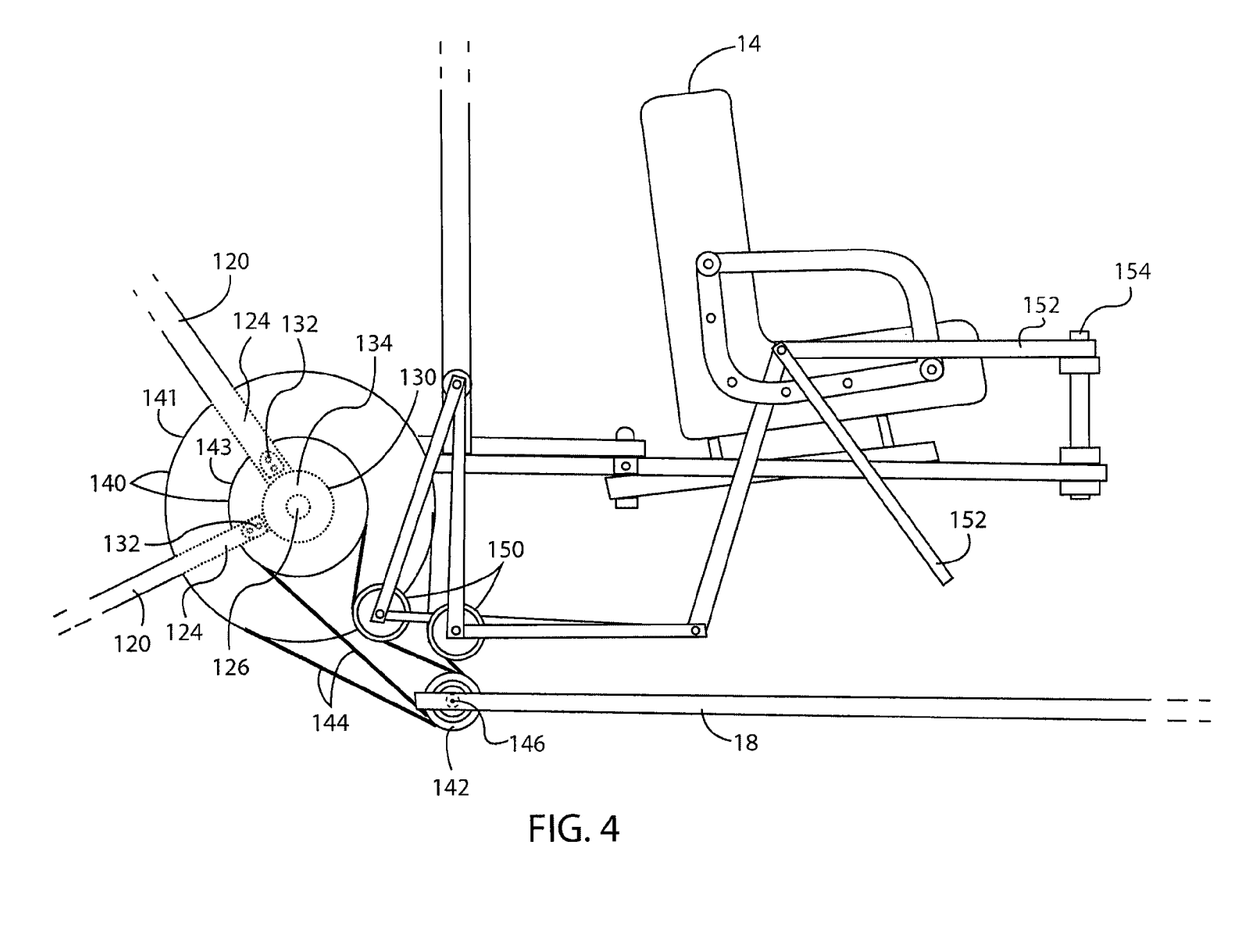
FIG. 4 is a side elevation view of the gearing incorporated into the human powered vehicle of FIG. 1.

The gears 142 mounted to the drive shaft 126 transfer the energy from the drive shaft 126 to the axle 146 and the corresponding drive wheel 20 mounted to the axle 146. According to one embodiment of the invention, a high gear 141 and a low gear 143 exist. The axle 146 includes a single gear 142 having a width sufficient to engage both the high gear 141 and the low gear 143. Optionally, multiple gears 142 may be mounted on the axle 146. It is contemplated that still other numbers and combinations of gears, 140 and 142, may be coupled to the drive shaft 126 and the axle 146, respectively, to facilitate transferring the energy from the drive shaft 126 to the axle 146 as the vehicle 10 is operating, for example, at different speeds or on varying grades.

Each of the high and low gears, 141 and 143 respectively, includes a selection lever 152. The desired selection lever 152 is raised up and placed on the lever holder 154 to select one of the gears, 141 or 143. As the selection lever 152 is raised up and pulled forward, the gear selection device 150 engages one of the belts 144 between the gear 142 on the axle 146 and the corresponding high or low gear, 141 or 143. Placing the selection lever 152 on the lever holder 154 maintains the required tension on the belt 144 without the operator having to continually hold the selection lever 152.

It is contemplated that one or more additional seats 14 may be added to the frame 18 to hold additional passengers and/or operators. For each additional seat 14, corresponding mechanical multipliers 50, forward and rear levers, 100 and 120, cable 112, and overriding clutches 130 may be mounted to allow multiple operators to each contribute to propelling the vehicle 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A mechanical force multiplier for use in a manually powered vehicle and configured to be mounted to a vehicle frame, comprising:
    a first member pivotally connected to a first point on the vehicle frame;
    a second member pivotally connected to a second point on the vehicle frame, wherein the second member is longer than the first member;
    a force receiving member operatively connected to the second member and configured to receive a force from an operator positioned on the vehicle frame; and
    a rigid section having a first end and a second end, the first end pivotally connected to each of the first and second members, wherein as the force from the operator is applied to the force receiving member, the second end of the rigid section travels in an arcuate path.

2. The mechanical force multiplier of claim 1 wherein:
    the first end of the rigid section includes a first connection point and a second connection point spaced apart from the first connection point,
    an end of the first member, distal from the first point on the vehicle frame, is pivotally connected to the first connection point of the first end of the rigid section,
    an end of the second member, distal from the second point on the vehicle frame, is pivotally connected to the second connection point of the first end of the rigid section,
    as the force from the operator is applied to the force receiving member, the first member pivots about the first point on the frame, and
    as the force from the operator is applied to the force receiving member, the second member pivots about the second point on the frame.

3. The mechanical multiplier of claim 2 wherein as each of the first and second members pivots about its respective points on the vehicle frame, the end of the first member, distal from the first point on the vehicle frame, travels in a shorter arcuate path than the end of the second member, distal from the second point on the vehicle frame such that the rigid section is rotated about the end of the first member, distal from the first point on the vehicle frame.

4. The mechanical force multiplier of claim 1 further comprising a first lever having a first end and a second end, wherein the first end of the first lever is pivotally connected to the vehicle frame and the second end of the first lever is configured to engage the second end of the rigid section such that the first lever moves between a first position and a second position as the second end of the rigid section travels in the arcuate path.

5. The mechanical force multiplier of claim 4 wherein the manually powered vehicle includes a drive train having a rotational drive member and a clutch operatively connected to the rotational drive member, the mechanical force multiplier further comprising a second lever having a first end and a second end, wherein the first end of the second lever is connected to the second end of the first lever via a cable, and the second end of the second lever is connected to the clutch to drive the rotational drive member.

6. A mechanical force multiplier for multiplying a force applied by a human operator seated on a first frame, the mechanical force multiplier comprising:
- a rigid frame portion having a first end and a second end;
- a pivoting frame portion having a first end and a second end, wherein the first end of the pivoting frame portion is pivotally connected to the first end of the rigid frame portion and the second end of the pivoting frame portion is pivotally connected to the first frame;
- a force receiving member mounted to the pivoting frame and configured to receive the force applied by the human operator, wherein the first end of the pivoting frame portion travels a first distance responsive to the force applied by the human operator and the second end of the rigid frame portion travels a second distance responsive to the force applied by the human operator and wherein the second distance is greater than the first distance.

7. The mechanical force multiplier of claim 6 wherein the rigid frame portion includes:
- a first set of elongated members, and
- a second set of elongated members, wherein each of the first and the second set of elongated members includes:
  - a first elongated member having a first end and a second end, the first elongated member defining the first end of the rigid frame,
  - a second elongated member having a first end, a second end, and a length, wherein the first end of the second elongated member is rigidly connected to the first end of the first elongated member,
  - a third elongated member having a first end, a second end, and a length, wherein:
    - the length of the third elongated member is greater than the length of the second elongated member,
    - the first end of the third elongated member is rigidly connected to the second end of the first elongated member, and
    - the second end of the second elongated member is rigidly connected to the third elongated member at a point between the first and the second ends of the third elongated member.

8. The mechanical force multiplier of claim 7 wherein a periphery of each of the first and the second set of elongated members is the same shape and each of the first and the second set of elongated members is laterally displaced from each other with respect to the first frame.

9. The mechanical force multiplier of claim 7 further comprising a roller operatively connected between the second end of the third elongated member of the first set of elongated members and the second end of the third elongated member of the second set of elongated members.

10. The mechanical force multiplier of claim 6 wherein the pivoting frame portion includes:
- a first set of elongated members, and
- a second set of elongated members, wherein each of the first and the second set of elongated members for the pivoting frame portion includes:
  - a first elongated member having a first end, a second end, and a length, wherein the first end of the first elongated member is pivotally connected to the first end of the rigid frame portion and the second end of the first elongated member is pivotally connected to the first frame; and
  - a second elongated member having a first end, a second end, and a length, wherein:
    - the length of the second elongated member is greater than the length of the first elongated member,
    - the first end of the second elongated member is pivotally connected to the first end of the rigid frame portion, and
    - the second end of the first elongated member is pivotally connected to the first frame.

11. The mechanical force multiplier of claim 10 wherein a periphery of each of the first and the second set of elongated members is the same shape and each of the first and the second set of elongated members is laterally displaced from each other with respect to the first frame.

* * * * *